April 26, 1955  C. GERST  2,707,056
TRACTOR SHOVEL
Filed May 9, 1951  2 Sheets-Sheet 1
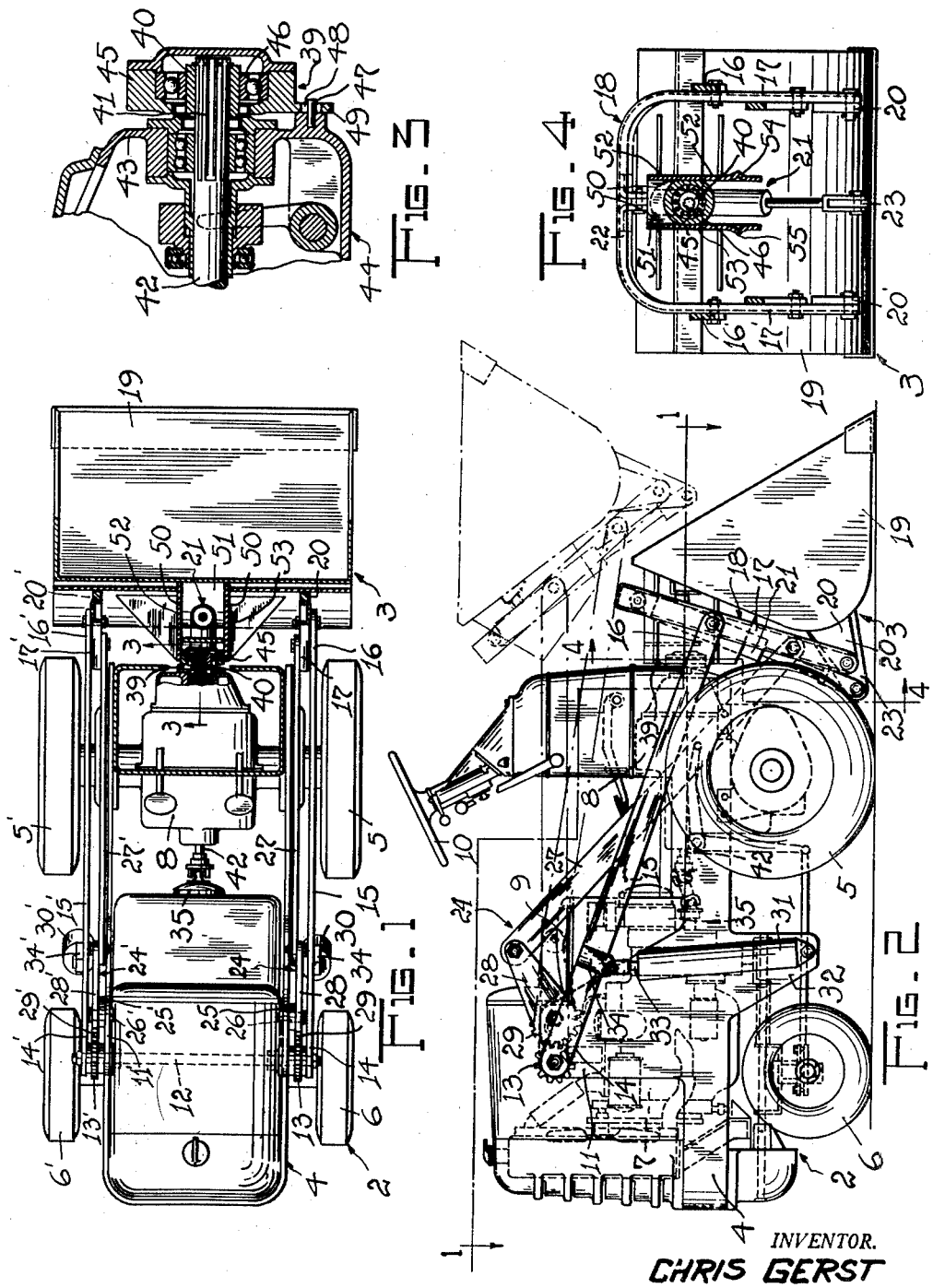
INVENTOR.
CHRIS GERST
BY
ATT.

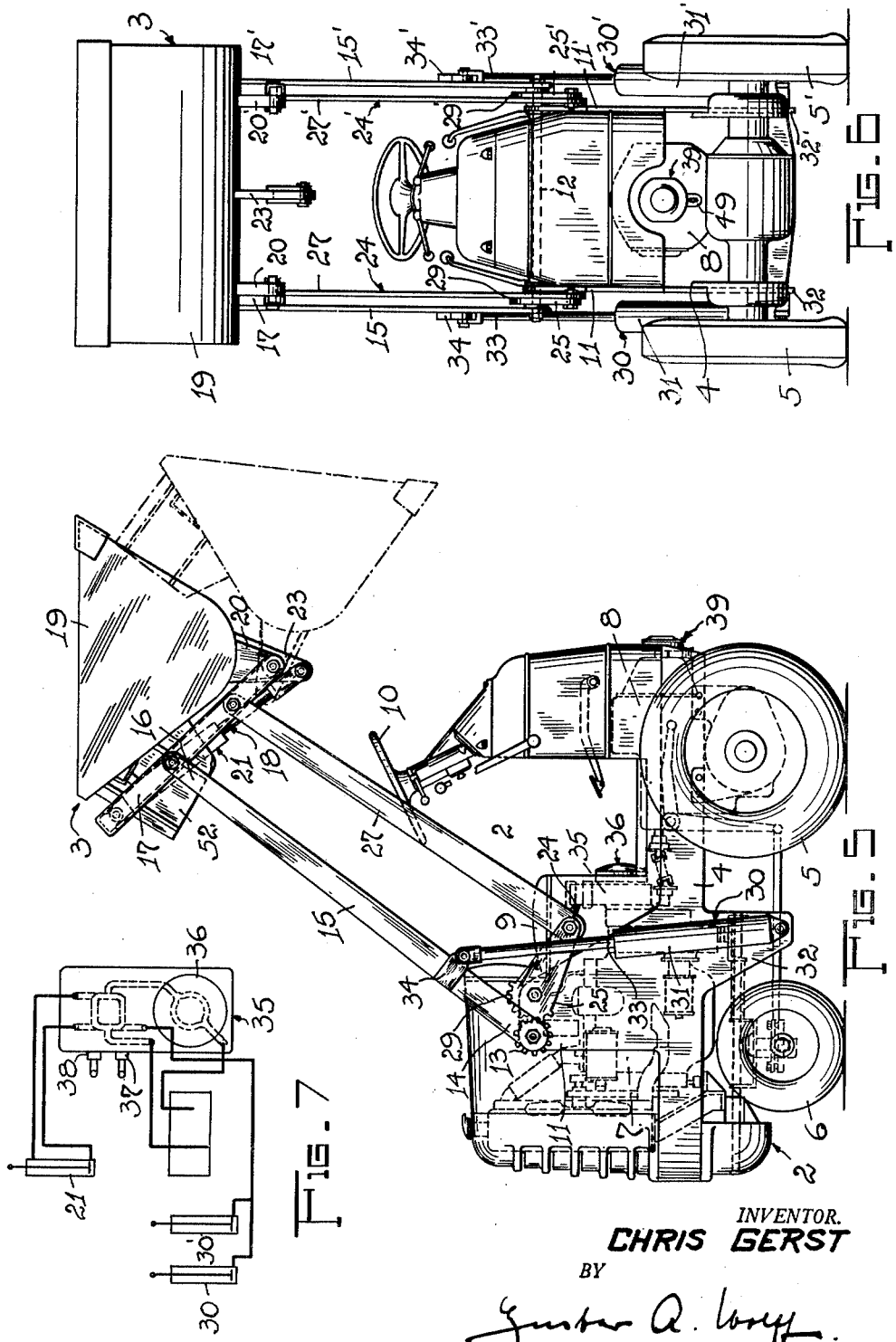

United States Patent Office 2,707,056
Patented Apr. 26, 1955

2,707,056

TRACTOR SHOVEL

Chris Gerst, Detroit, Mich., assignor, by mesne assignments, to Westinghouse Air Brake Company, a corporation of Pennsylvania Application May 9, 1951, Serial No. 225,338

4 Claims. (Cl. 214—140)

This invention relates in general to material handling and transferring equipment and, more particularly, to tractor-propelled, power-operated shovels with a shovel structure mounted on power-actuated mechanism adapted to raise the shovel structure from loading position to transport position to permit transport of a load to a place of deposit and tilt the shovel to discharge position to dump the load at its place of deposit.

The general object of the invention is the provision of a tractor-propelled, power-operated shovel of the type referred to above which is simple in structure and efficient in operation and which by special shovel supporting lever means quickly pivots the shovel structure to a full load retaining position in which position load and shovel have the lowest center of gravity level and do not obstruct the view of the operator when moving the load to its place of deposit.

Such a general object of the invention is attained by mounting the shovel structure of the tractor-propelled, power-operated shovel on a shovel frame hinged at spaced points to a vertically rockable boom member and a shovel control lever arrangement, the boom member and lever arrangement being supported by the tractor and coupled with each other to effect controlled change in the angular relation of the shovel frame with respect to the boom member and lever arrangement when the shovel frame and shovel structure are jointly raised and lowered by rocking movements of the boom member on the tractor.

Another object of the invention, therefore, is the provision of a tractor-propelled, power-operated shovel of the type referred to above which has its shovel structure mounted on a shovel frame hinged at spaced points to a vertically-rockable boom member and a shovel control arrangement and which has its boom member and the shovel control lever arrangement supported on the tractor and coupled with each other to effect controlled change in the angular relation of the shovel frame and structure with respect to the boom member and lever arrangement when the shovel frame and shovel structure are raised or lowered by controlled rocking movements of the boom member on the tractor.

A further object of the invention is the provision of a tractor-propelled, power-operated shovel of the type referred to above in which the shovel control lever arrangement includes a crank member rotatably supported by the tractor and geared to the boom member by gears aligned with the hinge connection of the boom member and tractor and the axis of the crank arm and furthermore includes a link connection coupling the crank arm of the crank member with the shovel frame to directly control the angular relation of the shovel frame and shovel structure when the shovel frame and shovel structure are raised and lowered by rocking movements of the boom member.

Still another object of the invention is the provision of a tractor-propelled, power-operated shovel of the type referred to above which includes power-actuated, oscillatory means on the tractor and cooperating means on the shovel frame and structure, the oscillatory and cooperating means arranged to align with each other when the shovel frame and structure are in lowered position for effecting oscillatory movements of the shovel structure when in loading operations the shovel structure digs into the material to be handled.

A still further object of the invention is the provision of a tractor-propelled, power-operated shovel of the type referred to above which includes on the tractor, axially aligned therewith, at one end thereof, oscillatory means actuated by eccentric means driven by the engine of the tractor and which includes on the shovel structure, at the rear end thereof, bracket means arranged to align with the oscillatory means when the shovel structure is in lowered position, the oscillatory means cooperating with the bracket means in oscillating the shovel structure in its lowered position to facilitate digging of the shovel structure into the material to be handled.

Additional objects and novel features of construction, combination and relations of parts by which the objects in view have been attained will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a horizontal, sectional view partly in elevation of a tractor-propelled, power-operated shovel embodying the invention, the section being taken on line 1—1 of Fig. 2;

Fig. 2 is a side view of the tractor-propelled, power-operated shovel structure disclosed in Fig. 1, the shovel structure being shown in full lines in its lowered position and in dash-dotted lines in an intermediate or transport position;

Fig. 3 is an enlarged, fragmentary sectional view of the oscillating mechanism taken on line 3—3 of Fig. 1;

Fig. 4 is a sectional view taken on line 4—4 of Fig. 2;

Fig. 5 is a side view similar to Fig. 2 except that the shovel structure is in fully raised position—full lines disclosing the position of the shovel structure prior to dumping operations and dash-dotted lines the position after dumping operations.

Fig. 6 is a front elevation of the tractor-propelled power-operated shovel when in the position shown in Fig. 5; and Fig. 7 is a diagram showing the hydraulic system actuating the boom members and the shovel structure.

Referring now in detail to the exemplified form of the invention shown in the drawings, the tractor-propelled, power-operated shovel disclosed therein includes an engine-propelled tractor vehicle 2 which mounts a power operated shovel 3. Tractor vehicle 2 which may be of any suitable design embodies a frame structure 4 with front and rear wheels 5, 5' and 6, 6', an engine 7 mounted on the rear portion of the frame structure, a transmission 8 arranged at the front portion of the frame structure and directly geared to the front or driving wheels 5, 5', an operator's seat 9 and a steering wheel 10 positioned above transmission 8. The tractor vehicle 2 rigidly mounts in upwardly extended, oppositely arranged portions 11, 11' of its frame structure 4 a shaft 12 which freely-rotatably supports on its opposite ends gears 13, 13' and the one ends 14, 14' of symmetrically arranged boom members 15, 15' keyed to gears 13, 13'. The boom members have their other ends 16, 16' hinged to side members 17, 17' of a U-shaped shovel frame 18 which carries a bucket-like shovel structure 19 hinged to the side members of shovel frame 18 by brackets 20, 20'. The shovel structure 19 is shiftably supported in desired angular relation with respect to shovel frame 18 by a cylinder-piston member 21 which links the web portion 22 of the shovel frame to a bracket 23 extended rearwardly from the shovel structure.

The rocking movement of shovel frame 18 on boom members 15, 15' is controlled by symmetrically-arranged lever arrangement 24, 24', each of which includes a crank member 25, 25', respectively, which is rotatably supported on a stud shaft 26, 26' respectively, on frame structure 4 and a link member 27, 27' respectively, connecting the respective lever arm 28, 28' of the respective crank members, with the respective side members of the shovel frame.

Crank members 25, 25' include gear sectors 29, 29' which mesh with gears 13, 13' on shaft 12 and effect coordinated action of boom members 15, 15' and lever arrangements 24, 24' in effecting control of the rocking movement of shovel frame 18 and shovel structure 19 when the boom members 15, 15' are raised or lowered. Such raising and lowering of the boom members is controlled by cylinder piston arrangements 30, 30', respectively, which have their cylinder members 31, 31' hinged to downwardly extended oppositely arranged portions 32, 32' on frame structure 4 and their piston members 33, 33' hinged to bracket 34, 34' attached to the respective boom members.

Cylinder piston arrangements 30, 30' and cylinder piston member 21 are actuated and controlled by a hydraulic system including a power pack 35, which is mounted on frame structure 4 and includes a pump 36, a single acting valve 37, and a double-acting valve 38. Pump 36 is directly coupled with and driven by the engine 7, single-acting valve 37 controls the flow of liquid to cylinder piston arrangements 30, 30' and double acting valve 38 controls the flow of liquid to the opposite ends of the cylinder piston member 21.

Loading operation of the tractor-propelled, power operated shovel is effected by driving the tractor vehicle 2 with shovel structure 19 in lowered position into the material to be loaded and thereafter the shovel structure is raised by operation of single-acting valve 37 actuating the cylinder piston arrangements 30, 30' to transport position, as shown in dash-dotted lines in Fig. 2, which gives the operator unobstructed view for driving the loaded tractor-propelled, power-operated shovel to the place of deposit of its load. Raising of shovel structure 19 to transport position also effects quick tilting of the shovel frame and structure from loading position to full load retaining position as boom members 15, 15' and crank arms 25, 25' of lever arrangements 24, 24' are rotated in opposite directions with respect to each other. At the place of deposit of its load, shovel structure 19 is further raised, if required, and then the load is dumped by operation of double-acting valve 38 actuated to effect by cylinder piston member 21 tilting of the shovel structure on shovel frame 18 to dumping position. After dumping operations shovel structure 19 is preferably tilted back to load-carrying position by operation of double-acting valve 38 to actuate cylinder piston member 21 in an opposite direction and finally lowered to transport position to give the operator unobstructed view in returning the tractor-propelled, power-operated shovel back to the loading point for further loading operations.

To facilitate loading of the shovel structure effected by forcing same in lowered position into the material to be handled, shovel structure 19 in its lowered position is oscillated by a vibratory mechanism 39 which is directly driven by the engine of the tractor. This vibratory mechanism includes an eccentric member 40 mounted on the outwardly extended end portion 41 of intake shaft 42 of transmission 8, which intake shaft is extended outwardly through the front wall 43 of the housing 44 of said transmission, and an oscillatory shoe member 45 encircling said eccentric member and freely rotatably supported thereby by a ball bearing 46. Oscillatory shoe member 45 which is shiftably and non-rotatably coupled with the front wall 43 of housing 44 by a pin 47 mounted in said front wall and extended into an elongated slot 48 in an extension 49 of shoe member 45, transfers its oscillatory movements to the shovel structure 19 when such shoe member in lowered position of the shovel structure engages the walls 50 of a channel 51 formed at the rear wall of shovel structure 19 by bracket members 52, 53 attached to said wall.

In operation of the tractor-propelled shovel structure, vibratory mechanism 39 is continuously actuated and the shovel structure 19 is engaged with the oscillatory shoe member 45 of such vibratory mechanism only when the shovel structure is lowered to loading position. To facilitate engagement of oscillatory shoe member 45 with guide channel 51 when shovel structure 19 is lowered, the bracket members 52 and 53 have their end portions 54 and 55, respectively, bent outwardly to properly guide shoe member 45 into said guide channel.

Having thus described my invention what I claim is:

1. In a power-operated tractor shovel having a frame, power-actuated elevating and lowering means hinged to said frame and a shovel structure hinged to said elevating and lowering means, a crank arm rotatably mounted on said frame adjacent to the hinge connection of said elevating and lowering means with said frame, a gear member mounted on said crank arm in alignment with its pivot axis, a second gear member mounted on said elevating and lowering means in alignment with its hinge connection with the frame and in mesh with the first gear member, and link means connecting said crank arm with said shovel structure at a point spaced from the hinge connection of said elevating and lowering means with the shovel structure, said two meshing gear members adapted to effect rotation of the crank arm in a direction opposite to the swinging direction of the elevating and lowering means when being raised and lowered to raise and lower the shovel structure.

2. In a power-operated tractor shovel having a frame, a power-actuated elevating and lowering boom pivotally supported at its one end by the frame to swing with respect thereto and a shovel structure pivotally supported by the other end of the boom, a rocking arrangement for the shovel structure including a crank arm journaled in the frame of the tractor shovel adjacent to the pivotal connection of the boom with the frame, gears mounted on said boom and said crank arm in axial alignment with their pivot axes, said gears meshing with each other to effect rotation of said crank arm in a direction opposite to the direction of the swinging movement of said boom, and link means linking the crank arm to the shovel structure.

3. In a power-operated tractor shovel having a main frame, power-actuated elevating and lowering means hinged to said main frame, a shovel frame rockingly mounted on the elevating and lowering means, a shovel structure rockingly mounted on the shovel frame, a crank arm rotatably mounted on said main frame adjacent to the hinge connection of said elevating and lowering means with said main frame, intermeshing gear means on said crank arm and on said elevating and lowering means alined with their respective pivot axes and adapted to effect rotation of said crank arm in a direction opposite to the direction of movement of said elevating and lowering means, link means linking the crank arm and shovel frame with each other, and power-actuated cylinder piston means pivoted to the shovel frame and the shovel structure and adapted to effect rocking movements of the shovel structure on said shovel frame when such power-actuated cylinder piston means is activated.

4. In a power-operated tractor shovel having a frame, a pair of power-actuated elevating and lowering booms pivoted to the frame at opposite sides thereof to swing with respect thereto, an inverted U-shaped shovel frame having its side members pivoted to said booms and a shovel structure rockingly mounted on said shovel frame, symmetrically arranged crank arms journaled in said frame at opposite sides thereof adjacent to the pivot connections of said booms with said frame, intermeshing gear members on said booms and crank arms aligned with the pivot axes of said booms and crank arms adapted to effect swinging movements of said booms and rotation of said crank arms in opposite directions with respect to each other, and link means linking the crank arms to the side members of the shovel frame at points spaced from the points at which the booms are pivoted to the shovel frame side members.

References Cited in the file of this patent

UNITED STATES PATENTS

| | | |
|---|---|---|
| 1,256,401 | Ward | Feb. 12, 1918 |
| 1,535,381 | Stage | Apr. 28, 1925 |
| 2,412,323 | Conrad | Dec. 10, 1946 |
| 2,449,212 | Fraga | Sept. 14, 1948 |
| 2,463,675 | Beyerstedt | Mar. 8, 1949 |
| 2,500,815 | Gerli et al. | Mar. 14, 1950 |
| 2,603,894 | Kennedy | July 22, 1952 |